United States Patent
Burke et al.

(10) Patent No.: US 12,195,954 B2
(45) Date of Patent: Jan. 14, 2025

(54) SYSTEM FOR MONITORING BACKFLOW PREVENTER CONDITION

(71) Applicant: Watts Regulator Co., North Andover, MA (US)

(72) Inventors: Joseph Michael Burke, Deerfield, NH (US); Kevin Simon, Somerville, MA (US); Ian David Baynes, Merrimac, MA (US); Myoung Soo Park, Marlborough, MA (US)

(73) Assignee: Watts Regulator Co., North Andover, MA (US)

( * ) Notice: Subject to any disclaimer, the term of this patent is extended or adjusted under 35 U.S.C. 154(b) by 218 days.

(21) Appl. No.: 17/834,513

(22) Filed: Jun. 7, 2022

(65) Prior Publication Data
US 2022/0333360 A1    Oct. 20, 2022

Related U.S. Application Data

(63) Continuation-in-part of application No. 17/115,872, filed on Dec. 9, 2020, now Pat. No. 11,427,992.
(Continued)

(51) Int. Cl.
     *E03B 7/07*          (2006.01)
     *F16K 15/06*       (2006.01)

(52) U.S. Cl.
     CPC .............. *E03B 7/075* (2013.01); *E03B 7/077* (2013.01); *F16K 15/066* (2013.01)

(58) Field of Classification Search
     CPC .... E03B 7/075; E03B 7/077; Y10T 137/7838; Y10T 137/0452; Y10T 137/8326; E03C 1/106; F16K 15/066; F16K 37/0041
See application file for complete search history.

(56) References Cited

U.S. PATENT DOCUMENTS

| 213,394 A | 3/1879 | Cornwall |
| 623,418 A | 4/1899 | O'Meara |

(Continued)

FOREIGN PATENT DOCUMENTS

| CN | 110081212 A | 8/2019 |
| DE | 1925477 A1 | 12/1970 |

(Continued)

OTHER PUBLICATIONS

Ames Fire & Waterworks, division of Watts Industries, F-A-Spools/Flanges (2001) 4 pages.
(Continued)

*Primary Examiner* — Jessica Cahill
(74) *Attorney, Agent, or Firm* — Day Pitney LLP; George Chaclas; Anthony A. Kassas

(57) ABSTRACT

A backflow preventer for preventing a reverse flow of water in a plumbing system including a body having an inlet and an outlet. The body forms an intermediate zone between the inlet and outlet. An inlet check valve prevents the reverse flow of water from the intermediate zone through the inlet. An outlet check valve prevents the flow of water from the outlet into the intermediate zone. An inlet pressure sensor, an intermediate pressure sensor and an outlet pressure sensor provide readings for the respective zones. A controller monitors a pressure differential between the outlet pressure zone and the intermediate pressure zone to compare the pressure differential to a pre-set range. The controller generates a warning/error message when the pressure differential is outside the pre-set range. The controller can also monitor an inlet pressure in the inlet zone to generate a message if the inlet pressure varies inappropriately.

17 Claims, 12 Drawing Sheets

Related U.S. Application Data

(60) Provisional application No. 63/208,292, filed on Jun. 8, 2021, provisional application No. 62/946,130, filed on Dec. 10, 2019.

(56) References Cited

U.S. PATENT DOCUMENTS

| | | | |
|---|---|---|---|
| 953,940 | A | 4/1910 | Beam |
| 2,310,586 | A | 2/1943 | Lohman |
| 2,514,374 | A | 7/1950 | Cooper |
| 2,533,097 | A | 12/1950 | Dale |
| 2,827,921 | A | 3/1958 | Sherman et al. |
| 3,173,439 | A | 3/1965 | Griswold et al. |
| 3,189,037 | A | 6/1965 | Modesto |
| 3,429,291 | A | 2/1969 | Hoffman |
| 3,570,537 | A | 3/1971 | Kelly |
| 3,817,278 | A | 6/1974 | Elliott |
| 3,837,357 | A | 9/1974 | Slaughter |
| 3,837,358 | A | 9/1974 | Zieg et al. |
| 3,859,619 | A | 1/1975 | Ishihara et al. |
| 3,896,850 | A | 7/1975 | Waltrip |
| 3,905,382 | A | 9/1975 | Waterston |
| 3,906,987 | A | 9/1975 | Rushforth et al. |
| 3,996,962 | A | 12/1976 | Sutherland |
| 4,014,284 | A | 3/1977 | Read |
| 4,244,392 | A | 1/1981 | Griswold |
| 4,276,897 | A | 7/1981 | Griswold |
| 4,284,097 | A | 8/1981 | Becker et al. |
| 4,416,211 | A | 11/1983 | Hoffman |
| 4,452,272 | A | 6/1984 | Griswold |
| 4,453,561 | A | 6/1984 | Sands |
| 4,489,746 | A | 12/1984 | Daghe et al. |
| 4,523,476 | A | 6/1985 | Larner |
| 4,618,824 | A | 10/1986 | Magee et al. |
| 4,667,697 | A | 5/1987 | Crawford |
| 4,694,859 | A | 9/1987 | Smith, III |
| 4,776,365 | A | 10/1988 | Bathrick et al. |
| 4,777,979 | A | 10/1988 | Twerdochlib |
| 4,920,802 | A | 5/1990 | Mcmullin et al. |
| 4,945,940 | A | 8/1990 | Stevens |
| 5,008,841 | A | 4/1991 | Mcelroy |
| 5,024,469 | A | 6/1991 | Aitken et al. |
| 5,072,753 | A | 12/1991 | Ackroyd |
| 5,125,429 | A | 6/1992 | Ackroyd et al. |
| 5,236,009 | A | 8/1993 | Ackroyd |
| 5,257,208 | A | 10/1993 | Brown et al. |
| 5,299,718 | A | 4/1994 | Shwery |
| 5,316,264 | A | 5/1994 | Newman, Sr. et al. |
| 5,404,905 | A | 4/1995 | Lauria |
| 5,425,393 | A | 6/1995 | Everett |
| 5,452,974 | A | 9/1995 | Binns |
| 5,520,367 | A | 5/1996 | Stowers |
| 5,551,473 | A | 9/1996 | Lin et al. |
| 5,566,704 | A | 10/1996 | Ackroyd et al. |
| 5,584,315 | A | 12/1996 | Powell |
| 5,586,571 | A | 12/1996 | Guillermo |
| 5,669,405 | A | 9/1997 | Engelmann |
| 5,709,240 | A | 1/1998 | Martin et al. |
| 5,711,341 | A | 1/1998 | Funderburk et al. |
| 5,713,240 | A | 2/1998 | Engelmann |
| 5,794,655 | A | 8/1998 | Funderburk et al. |
| 5,901,735 | A | 5/1999 | Breda |
| 5,918,623 | A | 7/1999 | Hidessen |
| 5,947,152 | A | 9/1999 | Martin et al. |
| 5,950,653 | A | 9/1999 | Folsom |
| 5,992,441 | A | 11/1999 | Enge et al. |
| 6,021,805 | A | 2/2000 | Horne et al. |
| 6,123,095 | A | 9/2000 | Kersten et al. |
| 6,155,291 | A | 12/2000 | Powell |
| 6,170,510 | B1 | 1/2001 | King et al. |
| 6,196,246 | B1 | 3/2001 | Folsom |
| 6,343,618 | B1 | 2/2002 | Britt et al. |
| 6,349,736 | B1 | 2/2002 | Dunmire |
| 6,374,849 | B1 | 4/2002 | Howell |
| 6,378,550 | B1 | 4/2002 | Herndon et al. |
| 6,396,404 | B1 | 5/2002 | Mchugh |
| 6,443,184 | B1 | 9/2002 | Funderburk |
| 6,471,249 | B1 | 10/2002 | Lewis |
| 6,513,543 | B1 | 2/2003 | Noll et al. |
| 6,546,946 | B2 | 4/2003 | Dunmire |
| 6,581,626 | B2 | 6/2003 | Noll et al. |
| 6,659,126 | B2 | 12/2003 | Dunmire et al. |
| 6,675,110 | B2 * | 1/2004 | Engelmann ......... F16K 37/0091 702/45 |
| 7,051,763 | B2 | 5/2006 | Heren |
| 7,114,418 | B1 | 10/2006 | Allen |
| 7,313,497 | B2 | 12/2007 | Breen et al. |
| 7,434,593 | B2 | 10/2008 | Noll et al. |
| 7,506,395 | B2 | 3/2009 | Eldridge |
| 7,784,483 | B2 | 8/2010 | Grable et al. |
| 7,934,515 | B1 | 5/2011 | Towsley et al. |
| 8,220,839 | B2 | 7/2012 | Hall |
| 8,753,109 | B2 | 6/2014 | Thiewes et al. |
| 8,997,772 | B2 | 4/2015 | Noll et al. |
| 9,091,360 | B2 | 7/2015 | Frahm |
| 9,303,777 | B2 | 4/2016 | Frahm, II |
| 9,476,805 | B2 | 10/2016 | Doran |
| 9,546,475 | B2 | 1/2017 | Lu |
| 9,899,819 | B1 | 2/2018 | Holloway |
| 9,995,605 | B2 | 6/2018 | Konno et al. |
| 10,022,532 | B2 | 7/2018 | Burdge |
| 10,132,425 | B2 | 11/2018 | Di Monte |
| 10,180,023 | B2 | 1/2019 | Zasowski et al. |
| D876,585 | S | 2/2020 | Li et al. |
| 10,561,874 | B2 * | 2/2020 | Williams ............... F16K 31/02 |
| D886,236 | S | 6/2020 | Pfund et al. |
| 10,719,904 | B2 | 7/2020 | Yasumuro et al. |
| D908,191 | S | 1/2021 | Li et al. |
| 10,883,893 | B2 | 1/2021 | Shaw et al. |
| 10,914,412 | B2 | 2/2021 | Doughty et al. |
| 10,962,143 | B2 | 3/2021 | Cis et al. |
| D917,013 | S | 4/2021 | Pfund et al. |
| D919,048 | S | 5/2021 | Li et al. |
| D919,049 | S | 5/2021 | Li et al. |
| D928,916 | S | 8/2021 | Shim |
| 11,137,082 | B2 | 10/2021 | Okuno et al. |
| D941,426 | S | 1/2022 | Downing et al. |
| D957,587 | S | 7/2022 | Downie et al. |
| D958,937 | S | 7/2022 | Pfund et al. |
| 11,427,992 | B2 | 8/2022 | Burke et al. |
| 11,449,082 | B1 | 9/2022 | Lindemann |
| 11,834,889 | B2 | 12/2023 | Tien |
| 2002/0043282 | A1 | 4/2002 | Horne et al. |
| 2002/0078801 | A1 | 6/2002 | Persechino |
| 2003/0000577 | A1 | 1/2003 | Noll et al. |
| 2003/0168105 | A1 | 9/2003 | Funderburk |
| 2004/0045604 | A1 | 3/2004 | Dunmire et al. |
| 2004/0107993 | A1 | 6/2004 | Stephens |
| 2005/0092364 | A1 | 5/2005 | Furuya et al. |
| 2005/0199291 | A1 | 9/2005 | Price et al. |
| 2005/0258582 | A1 | 11/2005 | Chou |
| 2006/0076062 | A1 | 4/2006 | Andersson |
| 2006/0111875 | A1 * | 5/2006 | Breen ............... F16K 37/0091 702/188 |
| 2006/0196542 | A1 | 9/2006 | Yen |
| 2007/0084512 | A1 * | 4/2007 | Tegge, Jr. ............... B63B 13/02 137/487.5 |
| 2007/0181191 | A1 | 8/2007 | Wittig et al. |
| 2007/0193633 | A1 | 8/2007 | Howell et al. |
| 2007/0204916 | A1 | 9/2007 | Clayton et al. |
| 2007/0204917 | A1 | 9/2007 | Clayton et al. |
| 2007/0240765 | A1 | 10/2007 | Katzman et al. |
| 2008/0145739 | A1 | 6/2008 | Adams et al. |
| 2008/0185056 | A1 | 8/2008 | Diodati et al. |
| 2008/0289567 | A1 | 11/2008 | Gordon |
| 2009/0136935 | A1 | 5/2009 | Petersen |
| 2009/0194719 | A1 * | 8/2009 | Mulligan ............... F16K 15/026 251/129.01 |
| 2010/0193043 | A1 * | 8/2010 | Erhardt ..................... F24H 9/13 137/215 |
| 2010/0313958 | A1 * | 12/2010 | Patel ..................... E03B 7/071 137/552 |
| 2011/0067225 | A1 | 3/2011 | Bassaco |
| 2011/0309076 | A1 | 12/2011 | Liebenberg et al. |

(56) References Cited

U.S. PATENT DOCUMENTS

| | | | |
|---|---|---|---|
| 2012/0248759 A1 | 10/2012 | Feith | |
| 2013/0026743 A1 | 1/2013 | Baca | |
| 2013/0051482 A1 | 2/2013 | Nassar et al. | |
| 2013/0255452 A1 | 10/2013 | Kovach | |
| 2014/0109986 A1 | 4/2014 | Cordes | |
| 2014/0130878 A1* | 5/2014 | Marinez | F17D 3/01 |
| | | | 137/487.5 |
| 2015/0051848 A1 | 2/2015 | Jurkowitz, Jr. | |
| 2015/0260310 A1 | 9/2015 | Bahalul | |
| 2017/0023141 A1 | 1/2017 | Andersson | |
| 2017/0191681 A1 | 7/2017 | Rosca et al. | |
| 2017/0234441 A1 | 8/2017 | Fuller et al. | |
| 2017/0278372 A1 | 9/2017 | Doughty et al. | |
| 2018/0156488 A1 | 6/2018 | Evans et al. | |
| 2019/0043157 A1 | 2/2019 | Yasumuro et al. | |
| 2019/0086289 A1 | 3/2019 | Shaw, Jr. et al. | |
| 2019/0136935 A1 | 5/2019 | Hulstein et al. | |
| 2019/0162341 A1 | 5/2019 | Chiproot | |
| 2019/0271428 A1 | 9/2019 | O'Connor et al. | |
| 2019/0281371 A1 | 9/2019 | Klicpera | |
| 2019/0323618 A1 | 10/2019 | Fletcher et al. | |
| 2020/0141612 A1 | 5/2020 | Thibodeaux | |
| 2020/0370677 A1 | 11/2020 | Mendez | |
| 2021/0172157 A1 | 6/2021 | Burke et al. | |
| 2021/0230850 A1 | 7/2021 | Bouchard et al. | |
| 2021/0332898 A1 | 10/2021 | Cellemme | |
| 2022/0049487 A1 | 2/2022 | Bouchard et al. | |
| 2022/0049786 A1 | 2/2022 | Doughty | |
| 2022/0333360 A1 | 10/2022 | Burke et al. | |
| 2022/0412474 A1 | 12/2022 | Bouchard et al. | |
| 2023/0228067 A1 | 7/2023 | Bouchard | |

FOREIGN PATENT DOCUMENTS

| | | |
|---|---|---|
| DE | 8525261 U1 | 11/1985 |
| DE | 202014102568 U1 | 9/2015 |
| DE | 202018107343 U1 | 2/2019 |
| EP | 1521004 A1 | 4/2005 |
| EP | 1830009 A1 | 9/2007 |
| EP | 2806203 A1 | 11/2014 |
| EP | 3434833 A1 | 1/2019 |
| EP | 3832183 A1 | 6/2021 |
| FR | 2928750 A1 | 9/2009 |
| GB | 1231579 A | 11/1967 |
| JP | 2002213629 A | 7/2002 |
| JP | 2019009698 A | 1/2019 |
| WO | 2003060459 A1 | 7/2003 |
| WO | 2020023584 A1 | 1/2020 |

OTHER PUBLICATIONS

Apollo Valves PVB4A Series Installation, Operation and Maintenance Manual for Model PVB4A 1/2"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Conbraco BFMMPVB Maintenance Manual for Series 4V-500 1/2"-2" Pressure Type Vacuum Breaker, (Apr. 2002), Conbraco Industries, Inc., Matthews, North Carolina 28106, 6 pages.
Lead Free Master Series LF870V product specifications pages, ES-F-LF-870V 1826 (2018) 4 pages.
Extended European Search Report received for European Patent Application No. 20211811.3, dated May 4, 2021, 8 pgs.
Watt TK-99E Backflow Preventer Test Kit Product Specifications and Test Information, IS-TK99E 0829 (2009) 4 pages.
Watts Water Company, Series 909RPDA for Health Hazard Applications (2016) 4 pages.
Watts, "Double Check Valve Assembly Backflow Preventers, Bronze," Article 1, (2021) 6 pages.
Watts, "Reduced Pressure Zone Assembly Backflow Preventers, Bronze Body, Sizes 1/4-2 IN," Article 1 (2021) 16 pages.
Watts, S-RetroFit-Simple (2017) 2 pages.
Wilkins Company, Model 375/475MS Series, Installation, Maintenance and Instruction Sheet (2006) 1 page.
International Report on Patentability with Written Opinion corresponding to International Application No. PCT/US2021/046208, mailed Mar. 2, 2023, 7 pages.
International Search Report and Written Opinion issued in corresponding international patent application No. PCT/US2021/046101, mailed Nov. 22, 2021, 10 pages.
International Search Report and Written Opinion issued in corresponding International Patent Application No. PCT/US2021/062395, mailed Feb. 23, 2022, 14 pages.
Apollo Valves, Apollo backflow preventer in-line "R" retrofit series, (date unknown), 2 pages.
European Search Report for European Patent Application No. 20192133.5 dated Feb. 1, 2021, 9 pages.
International Search report and Written Opinion issued in corresponding International patent Application No. PCT/US2021/046208, mailed Dec. 1, 2021, 7 pages.
Watts Regulator Co., Watts ACV 113-6RFP Flood Protection Shutdown Valve for health Hazard Applications (2020) 4 pages.
Watts Water Technologies Company, Installation, Maintenance & repair Series 909, LF909, 909RPDA, LF909RPDA (2016) 8 pages.
Zurn Wilkins 300AR Series, Backflow Preventer Order Form No. 480-060, Apr. (2017) 2 pages.
Wilkins Model 420 XL Lead-Free pressure Vacuum Breakers 1/2", 3/4", and 1" (date unknown), 2 pages.
Watts Water Technologies Company Brochure ES LF800M4QT for Health Hazard Applications Lead Free Series LF8 M4QT Anti-Siphon Vacuum Breakers Sizes 1/2"-2", copyright 2013, 4 pages.
Watts Regulator Co. 0887224 Series 909 Reduced Pressure Zone Assemblies Relief/Check Valve Kits 2 1/2"-10", site visited Jul. 19, 2023, URL: https://controlscentral.com/tabid/63/ProductID/315241/watts-regulator-0887224-series-909-reduced-pressure-zone-assemblies-relief.aspx (Year: 2023).
AU Examination Report corresponding to Application No. 2021328510, dated Sep. 19, 2023, 3 pages.

* cited by examiner

```
1  nbin=75
2  h,xe,ye,_=plt.hist2d(GF.df.loc[:,'dp1'], GF.df.loc[:,'dp2'], bins=nbin)
3  plt.xlabel('DP 1 [psi]')
4  plt.ylabel('DP 2 [psi]')
5  plt.show()
```

FIG. 12

```
1  argm = np.argmax(h)
2  xem = np.floor(argm/nbin)
3  yem = np.mod(argm,nbin)
4
5  xans = (xe[int(xem)] + xe[int(xem)+1])/2
6  yans = (ye[int(yem)] + ye[int(yem)+1])/2
7
```

```
1  print('Cracking pressure for check #1 is ' + str(round(xans,2)) + ' psi.
2  print('Cracking pressure for check #1 is ' + str(round(yans,2)) + ' psi.
3
```

Cracking pressure for check #1 is 8.53 psi.
Cracking pressure for check #1 is 1.4 psi.

FIG. 13

SYSTEM FOR MONITORING BACKFLOW PREVENTER CONDITION

CROSS-REFERENCE TO RELATED APPLICATIONS

This application claims priority to and the benefit of U.S. Provisional Patent Application No. 63/208,292 filed Jun. 8, 2021 and this application is a continuation-in-part of and claims priority to and the benefit of U.S. patent application Ser. No. 17/115,872 filed on Dec. 9, 2020 which claims priority to and the benefit of U.S. Provisional Patent Application No. 62/946,130, filed Dec. 10, 2019.

FIELD OF THE DISCLOSURE

The subject disclosure relates to backflow prevention valves and assemblies, and more particularly to remote and/or continuous digital monitoring of the condition of the check valves in a backflow prevention system.

BACKGROUND

In many water systems, a backflow prevention valve and assembly, sometimes referred to as a backflow preventer (BFP), assures that a fluid, and any solids therein, flows in only a desired direction, i.e., a forward direction. As back siphonage, or backflow, may cause contamination and health problems, a BFP prevents flow in an undesired direction, i.e., a backward or reverse direction. For example, backflow prevention valves and assemblies are installed in all manner of buildings, such as residential homes, and commercial buildings and factories, to protect public water supplies by preventing the reverse flow of contaminated water back into the public water supply.

Referring now to FIGS. 1a and 1b, a backflow preventer (BFP) 100 according to the prior art includes a body 102 having an inlet 104 and an outlet 106 where the forward flow direction F is shown. It is noted that many different configurations of backflow prevention assemblies are possible, each being different in configuration, and the BFP 100 presented here is an example for illustration.

As shown in sectional view of FIG. 1b, the BFP 100 includes a first check assembly 110a and a second check assembly 110b. The exemplary embodiment shown also includes a relief valve assembly 108 located between the check assemblies 110a, 110b to allow water to drain from between the check assemblies 110a, 110b under certain circumstances. For example, the relief valve assembly 108 may open to release water if the second check assembly 110b should fail to prevent backflow.

Owing to the fact that backflow preventers (BFPs) are important for water safety, BFPs are typically manually tested on an annual basis to assure proper operating conditions. Specifically, fluid pressure measurements are taken at specified locations in the BFP 100 using a manual testing kit 111, an example of which is shown in FIG. 1a connected to the BFP 100. To facilitate these pressure measurements, the BFP 100 includes Test Cocks (TCs) 112a-c for easy access and connection. The TCs 112a-c extend through the body 102 of the BFP 100.

Accordingly, a first TC 112a measures the pressure coming into the BFP 100; a second TC 112b measures the pressure just after the first check assembly 110a; and a third TC 112c measures the pressure right after the second check assembly 110b. Again, because of the public safety importance of the BFP, it is often a certified BFP Technician that conducts the testing on site to confirm that the BFP is in compliance with national standards bodies' requirements. The testing involves connecting the testing kit 111 to the TCs 112a-c and executing various procedures to ensure that the BFP 100 is operating properly.

SUMMARY

In view of the above, what is needed is a system for monitoring the status of a BFP to ensure proper operation and/or simplification of the testing process. The subject technology relates to a digital monitoring system that can remotely and/or continuously monitor the condition of the check assemblies in a backflow prevention system. The subject technology also provides more cost efficient systems and methods compared to sending a qualified technician to perform a manual test. Further, the subject technology helps avoid failure between manual testing times.

The subject technology can be adapted to meet a variety of testing requirements. For example, for a double check backflow preventer, the opening and/or closing pressure can be determined as well as water-tightness. For reduced pressure backflow preventers, a relief valve opening test can also be performed.

In one embodiment, the subject technology is directed to a backflow preventer for preventing a reverse flow of water in a plumbing system including a body having an inlet for connection to an upstream portion of the plumbing system, an outlet for connection to a downstream portion of the plumbing system, and an intermediate zone between the inlet and outlet. An inlet check valve located in the body prevents the reverse flow of water from the intermediate zone through the inlet. An outlet check valve located in the body prevents the reverse flow of water from the outlet into the intermediate zone. An inlet pressure sensor is located in an inlet pressure zone positioned in the body between the inlet and the first check valve. An intermediate pressure sensor is located in the intermediate pressure zone. An outlet pressure sensor is located in an outlet pressure zone positioned in the body between the outlet and the second check valve. A controller in communication with the pressure sensors and operative to monitor a pressure differential between the outlet pressure zone and the intermediate pressure zone, compare the pressure differential to a pre-set range, generate a first message when the pressure differential is outside the pre-set range, monitor an inlet pressure in the inlet zone, and generate a second message if the inlet pressure varies inappropriately.

The controller may determine a cracking pressure for each check valve based upon communications received from the position sensors and the pressure sensors. The controller can also generate an error signal if either cracking pressure is outside a predetermined range. The cracking pressure of the first check valve is equal to a difference between the first pressure sensor and the second pressure sensor when the first position sensor detects the first check valve moves from a closed position to an open position. The controller can determine a closing pressure for each check valve based upon based upon communications received from the position sensors and the pressure sensors. The closing pressure of the second check valve is equal to a difference between the third pressure sensor and the second pressure sensor when the second position sensor detects the second check valve moves from an open position to a closed position. The controller may be further operative to generate a leak error signal if pressure in the intermediate pressure zone rises while both check valves are in a closed position. The controller can also monitor stiffness of seals of the check valves based upon communications received from the second pressure sensor when the position sensors communicate that the check valves are both in a closed position. Preferably, the controller is further operative to detect leaks in the downstream portion of the plumbing system based upon communications received from at least one of the pressure sensors and the position sensors. The second message is typically generated when the inlet zone and the intermediate zone are approximately equal. The backflow preventer may also have an expansion tank connected downstream from the outlet check valve for selectively stabilizing an outlet pressure in the outlet pressure zone, wherein the controller is further operative to determine pistoning and fluidly connect the expansion tank to the outlet pressure zone based on the pistoning.

Another embodiment of the subject technology is a system for monitoring a backflow preventer valve assembly in a fluid network in a building having an inlet pressure sensor for determining pressure at an inlet of the backflow preventer valve assembly, an intermediate pressure sensor for determining pressure between an inlet and an outlet check valve, an outlet pressure sensor for determining pressure at an outlet of the backflow preventer valve assembly, and a controller in communication with the pressure sensors. The controller can determine when the building is unoccupied, retrieve and store readings from the pressure sensors when the building is unoccupied, compare readings from inlet pressure sensor and intermediate pressure sensor, if the reading from the inlet pressure sensor and the intermediate pressure sensor are substantially equal, generate a warning indicating that a leak may be present, compare the readings from the outlet pressure sensor and the intermediate pressure sensor at a first point in time, start a timer, when the timer has run out at a second point in time, recheck if the readings from the outlet pressure sensor and the intermediate pressure sensor are equal, if the readings from the outlet pressure sensor and the intermediate pressure sensor are substantially equal at the first and second points of time, generate a warning that a leak may be present through a downstream check valve assembly. The controller may be further operative to determine when the building is unoccupied based on the readings from the outlet pressure sensor, or determine when the building is unoccupied based on time of day and the warning indicating that the leak may be present indicates that the leak is through an upstream check valve assembly.

The subject technology also is a system for monitoring a backflow preventer valve assembly in a fluid network in a building including an inlet pressure sensor for determining pressure at an inlet of the backflow preventer valve assembly, an intermediate pressure sensor for determining pressure between an inlet and an outlet check valve, an outlet pressure sensor for determining pressure at an outlet of the backflow preventer valve assembly, and a controller in communication with the pressure sensors. The controller is preferably operative to compare the readings from the outlet pressure sensor and the intermediate pressure sensor at a first point in time, start a timer, when the timer has run out at a second point in time, recheck if the readings from the outlet pressure sensor and the intermediate pressure sensor are equal, and if the readings from the outlet pressure sensor and the intermediate pressure sensor are substantially equal at the first and second points of time, generate a warning that a leak may be present through a downstream check valve assembly.

Preferably, at least one of the pressure sensors is powered using energy harvesting methods that take advantage of water flowing throw the backflow preventer valve assembly, such as hydroelectric power generation. At least one of the pressure sensors may be part of a test cock, which is original or a subsequent retrofit. A relief valve assembly can be located between the check valves. The system may also have an expansion tank coupled downstream of the outlet and in communication with the controller to selective reduce pistoning by providing steady and stable pressure difference readings for backflow heath monitoring based on readings from the intermediate pressure sensor.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure.

FIG. 1b is a sectional view of the BFP of FIG. 1a.

FIG. 12 is an exemplary software code routine for creating the graph of a two dimensional histogram illustrating the differential pressure DP1 versus differential pressure DP2 with the most recorded data points in accordance with the subject technology.

FIG. 13 is an exemplary software code routine to determine the pressure differential across each check valve in accordance with the subject technology.

DETAILED DESCRIPTION

Figure 1A:
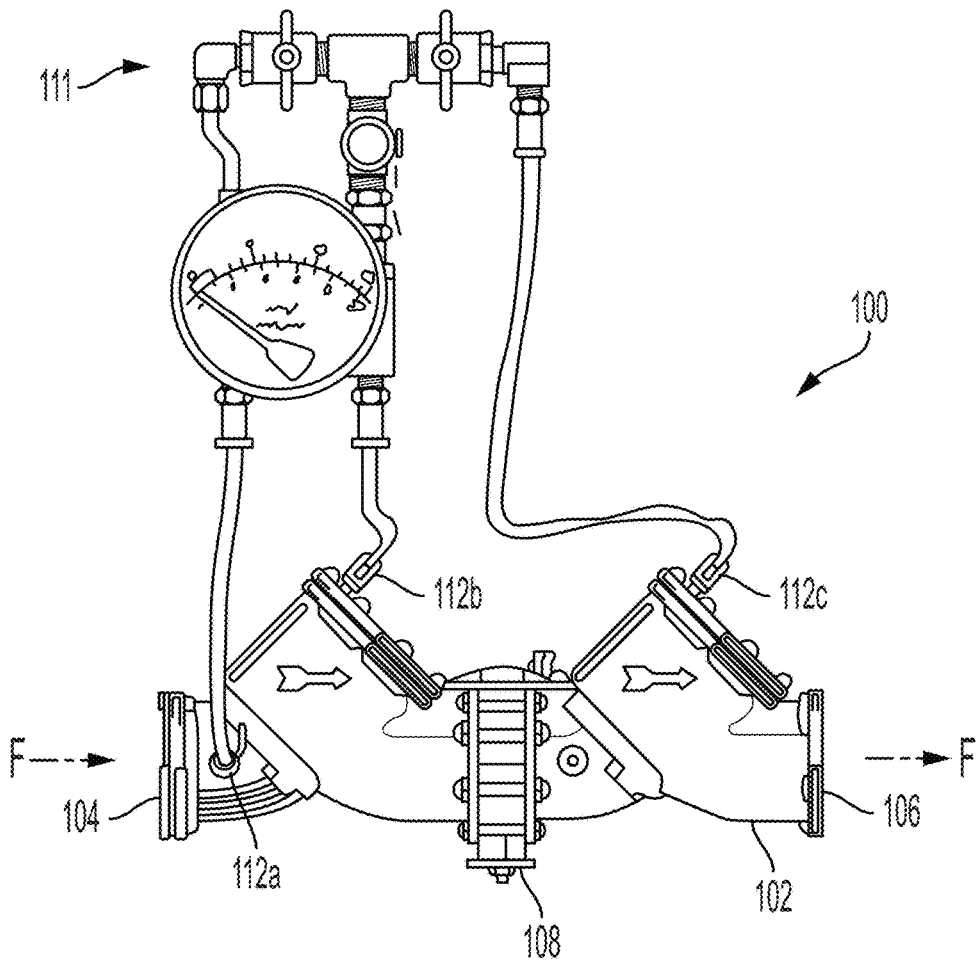
FIG. 1a shows a backflow preventer (BFP) and test kit in accordance with the prior art.

The subject technology provides condition monitoring for backflow preventers. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
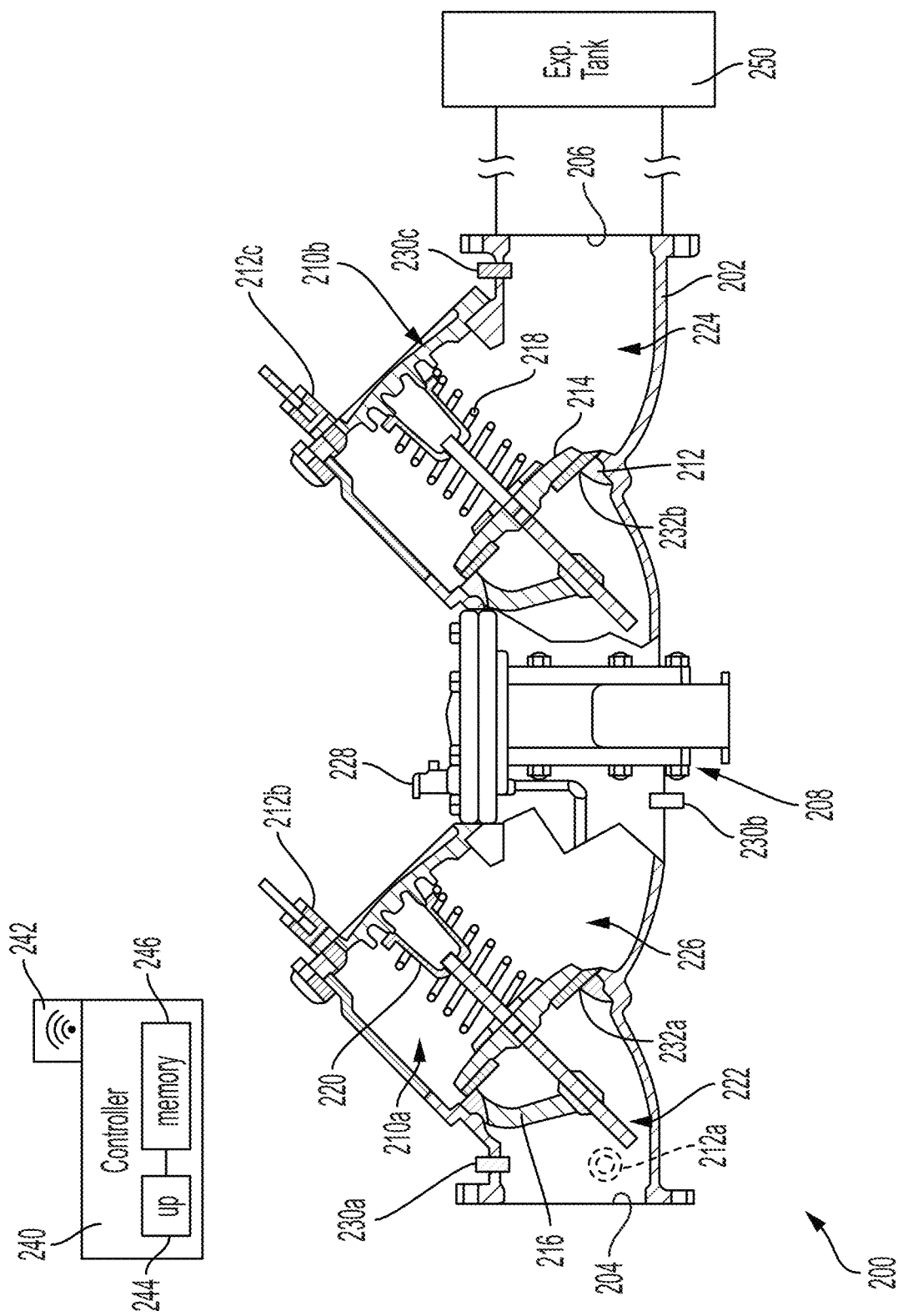
FIG. 2 shows a cross-sectional view of a BFP system in accordance with the subject technology.

Referring now to FIG. 2, a cross section of a backflow preventer (BFP) system 200 is shown. The BFP system 200 comprises a body 202 forming an inlet 204 and an outlet 206 for coupling into a fluidic network (not shown) to prevent backflow from the outlet 206 to the inlet 202. The fluidic network may for example be a plumbing system located in a residential or commercial building. A first check valve assembly 210a couples to the inlet 204 with a second check valve assembly 210b coupled to the outlet 206. For efficient manufacturing, the first and second check valves assemblies 210a, 210b may be identical but it is not necessary. The check valve assemblies 210a, 210b shown are illustrative and it is understood that many different check valve assemblies would be well-suited to the subject disclosure. For example, the check valve assemblies may include poppet type check valves or swing type check valves.

In the exemplary embodiment shown, a relief valve assembly 208 is located between the two check valve assemblies 210a, 210b. Under certain conditions, the relief valve assembly 208 may open to allow water to drain from between the check valve assemblies 210a, 210b. However, it should be understood that the subject technology can be applied to a BFP that does not include a relief valve assembly.

Each check valve assembly 210a includes a valve seat 212. A valve disc 214 selectively opens and closes the fluid flow path of the valve seat 212. In the exemplary embodiment shown, the valve disc 214 is slidably mounted on a valve guide 216. A spring 218 extends between a spring mount 220 and the valve disc 214 for biasing the valve disc 214 to a normally closed position. To move to the open position, pressure at the inlet 204 must overcome the force of the spring 218. The second check valve assembly 210b works similarly, but not necessarily. For simplicity and clarity, the second check valve assembly 210b has the same reference numbers on the similar components and not further described herein.

Still referring to FIG. 2, the check valve assemblies 210a, 210b create three distinct pressure zones. An inlet pressure zone 222 is located in the body 202 between the inlet 204 and the first check valve assembly 210a, an outlet pressure zone 224 is between the second check valve assembly 210b and the outlet 206, and an intermediate pressure zone 226 is located in the body 202 between the check valve assemblies 210a, 210b.

The first check valve assembly 210a includes a test cock (TC) 212a located before the respective valve seat 212 and a TC 212b after the respective valve seat 212, while the second check valve assembly 210b includes a TC 212c located after the respective valve seat 212. The first TC 212a can be used to manually measure pressure in the inlet pressure zone 222, the second TC 212b can be used to measure pressure in the intermediate pressure zone 226, and the third TC 212c can be used to measure pressure in the outlet pressure zone 224.

Pressure sensors 230a-c are mounted in the body 202 for generating signals indicative of each zone 222, 224, 226. The pressure sensors 230a-c can be easily mounted external to the body 202 such as by incorporating the pressure sensors in the test cocks in retrofit situations or by incorporation into the body 202 in new or old designs. The pressure sensors 230a-c may be hard wired or provided with a battery and communicate wirelessly. The pressure sensors 230a-c may be powered using energy harvesting methods that take advantage of the water flowing throw the body 202, such as hydroelectric power generation. The first pressure sensor 230a measures pressure in the inlet pressure zone 222, the second pressure sensor 230b measures pressure in the intermediate pressure zone 226, and the pressure sensor 230c measures pressure in the outlet pressure zone 224.

A controller 240 receives the signals from the pressure sensors 230a-c. Preferably, the controller 240 includes a wireless module 242 not only for communicating with the pressure sensors 230a-c but connecting with networks, whether private or public. As a result, the controller 240 can send information such as status, warning and error conditions to smart devices such as desktop computers, smart phones, tablets and other monitoring equipment. The controller 240 also includes a processor 244 and memory 246 for storing data and running instructions to accomplish the activity envisioned in the subject disclosure.

The controller 240 also communicates with position sensors 232a, 232b on each check valve assembly 210a, 210b. The position sensors 232a, 232b generate signals indicating whether the respective check valve assembly 210a, 210b is open or closed, i.e., the position of the valve disc 214 with respect to the valve seat 212. As many types of contact, pressure and position sensors are practical for use in the subject technology, the position sensors are shown somewhat schematically. Similar to the pressure sensors 230a-c, the position sensors 232a, 232b may be placed in various locations and utilize various technology now known and later developed.

For example, the position sensors 232a, 232b may be: 1) a rubber contact switch embedded in rubber placed in parallel to the valve seat 212 and the valve disc 214; 2) sensing the state of an electro-active polymer, piezoelectric element, or capacitor embedded in the valve disc 214; 3) non-contact position sensing such as eddy current, a hall effect sensor, or capacitive sensing; 4) contact sensing such as placing a sensor under the valve seat 212 such that the sealing force passes through the sensor; 5) a leaf spring which gently connects a circuit involving the seat 212 and the disc 214, but deforms in the presence of flow such that there is no electrical connection; and 6) measuring strain in the valve disc 214 and/or the seat 212 as a result of closure. Further, one or more position or contact sensors may be placed on the valve seat 212, the valve disc 214, in between the valve seat 212 and the valve disc 214, or some combination thereof and the like to determine the position of the respective check valve assembly 210a, 210b.

In operation, when the BFP system 200 is functioning properly and no problems are present in the fluidic network, and the BFP system 200 is in a static condition with the state of the check valve assemblies 210a, 210b closed, then no fluid flows through the system. The pressure in the intermediate pressure zone 226, sensed by pressure sensor 230b, is theoretically constant. Similarly, the pressures in the inlet and outlet pressure zones 222, 224, sensed by the pressure sensors 230a, 230c, should also be relatively constant. The controller 240 can monitor and store the pressure readings and, preferably generate graphs for display and review with supporting data.

By selection of the force of the springs 218 and other parameters, the pressure required to open one or both of the check valve assemblies 210a, 210b (e.g., the cracking pressure) is set. Cracking pressure is not only an important design consideration but typically a regulated value for BFP check valve performance. Further, it is undesirable for the check valve assemblies 210a, 210b to leak. For proper performance, when closed, the check valve assemblies 210a, 210b should maintain a complete seal. The cracking pressure and improper pressure changes due to leakage can be tracked by the controller 240 to insure proper operation.

To determine the cracking pressure of the first check valve assembly 210a, the controller 240 continuously monitors the pressure difference between the inlet pressure zone 222 and the intermediate pressure zone 226 using the pressure sensors 230a, 230b. The controller 240 also monitors the signals from the position sensor 232a to determine when the check valve assembly 210a opens and closes. When the first check valve assembly 210a opens or closes, the controller 240 can determine the respective cracking pressure value and track the cracking pressure over time during multiple openings and closings. In short, measuring the pressure difference between the inlet pressure zone 222 and the intermediate pressure zone 226 at the instant that the check valve assembly 210a opens provides direct continuous monitoring of that cracking pressure value over time. Likewise, the pressure difference between the outlet pressure zone 228 and the intermediate pressure zone 226 at the instant that the second check valve assembly 210b opens provides direct continuous monitoring of the cracking pressure value of the second check valve assembly 210b over time.

If the cracking pressure is not in accordance with specifications or regulations, the controller 240 can generate and send a specific related error signal with the underlying data immediately for prompt investigation and correction. The controller 240 can compare the cracking pressure to the relevant history or a set value so that deviation by a predetermined value is defined as a warning or error condition as the case may be. For example, a deviation of 2 psi down from standard can be an error whereas 1.5 to 2 psi can generate only a warning. The controller can also note trends, such as repeated warning conditions or a drift in cracking pressure, in the readings that may indicate physical inspection, service and/or replacement is proper.

Furthermore, if both check valve assemblies 210a, 210b are closed, the pressure in the intermediate pressure zone 226 should be constant. If there are pressure changes or fluctuations in the intermediate pressure zone 226 when the check valve assemblies 210a, 210b are closed, this is an indication that leaking can be present. For example, a sudden rise in the pressure reading of the intermediate pressure zone 226 while both check valve assemblies 210a, 210b are closed could be caused by one of the check valve assemblies 210a, 210b leaking. Again, the controller 240 can generate and send a related error signal immediately for prompt investigation and correction.

The foregoing subject technology has a number of benefits over the known approaches, including, but not limited to automating the collection of data so that the system is operationally compliant for a larger amount of time. Ideally, periodic manual testing can be reduced or even eliminated. If manual testing is reduced or eliminated, it is envisioned that BFPs could be fabricated without the required manual testing components (e.g., manual shutoff valves, test cocks etc.) so that size, cost and complexity can be reduced. By having automated monitoring, the cost of manual inspection and testing by a certified professional is reduced. Also, prompt detection and review of warning and error conditions helps to reduce the likelihood of a backflow event. As can be seen, the capital costs, the cost of ownership, and the safety of the water distribution system are all improved by the subject technology.

Generally, any sensor technology now known or later developed can be used in the subject technology for determining the position of the check valves. Preferably, the position sensor robustly differentiates between all closings and even slight openings. Additionally, the position sensor should not interfere with normal operation or performance so that the check valves still seal without interference.

Figure 3:
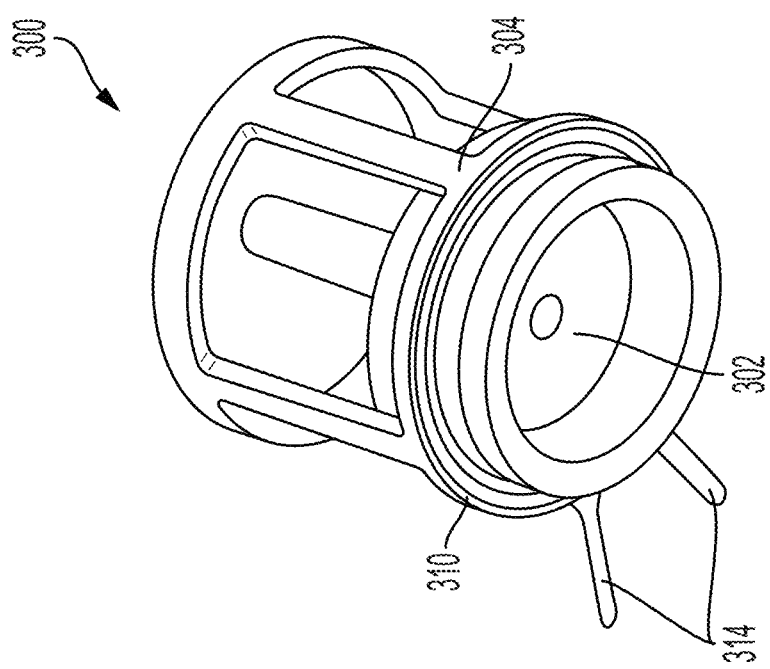
FIG. 3 is an isolated bottom perspective view of a check valve disc and seat assembly with a contact pressure sensor in accordance with the subject technology.

Referring now to FIG. 3, an isolated bottom perspective view of a check valve disc and seat assembly 300 with a contact pressure sensor 310 in accordance with the subject technology is shown. The assembly 300 includes a disc 302 that sealingly mates with a seat 304. A contact sensor 310 is coupled to the assembly 300 for generating a signal based upon closing pressure between the disc 302 and seat 304. In other words, the contact sensor 310 is positioned so that when a valve using the assembly 300 is closed, the sensor 310 is actively verifying the valve position. The sensor 310 can be placed behind the valve disc 302 or formed in the valve disc 302 or valve seat 304. As shown, the sensor 310 is placed under the valve seat 304 so that upon the disc 302 closing against the seat 304, the pressure is transmitted to the sensor 310.

Figure 4:
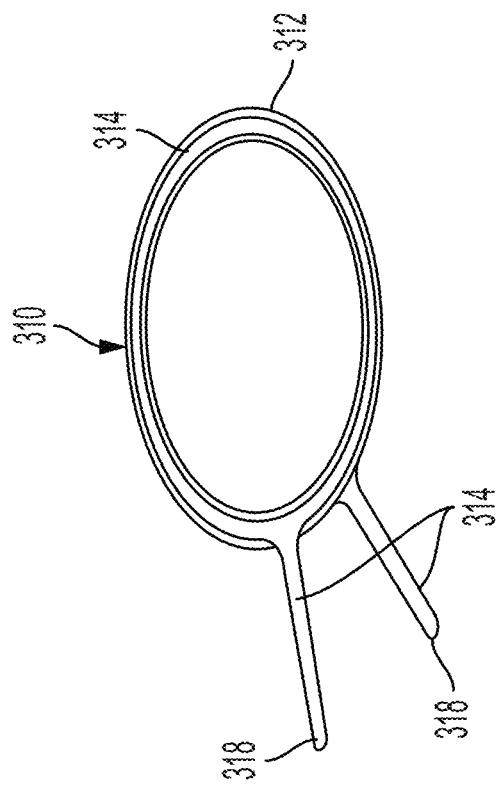
FIG. 4 is a perspective view of a piezoresistive composite sensor trace for a pressure sensor in accordance with the subject technology.

Referring now to FIG. 4, a perspective view of a piezoresistive composite sensor trace 312 for a pressure sensor 310 in accordance with the subject technology is shown. The trace 312 includes a piezoresistive material that changes resistance in response to pressure. In the embodiment shown, the trace 312 is a polyolefin and carbon black composite 316 sandwiched between two copper current collectors 314 and then laminated. The ends 318 of the current collectors 314 serve as leads to additional components not shown. When positioned properly, the trace 312 will generate an electrical signal indicative of pressure being applied thereto.

Figure 5:
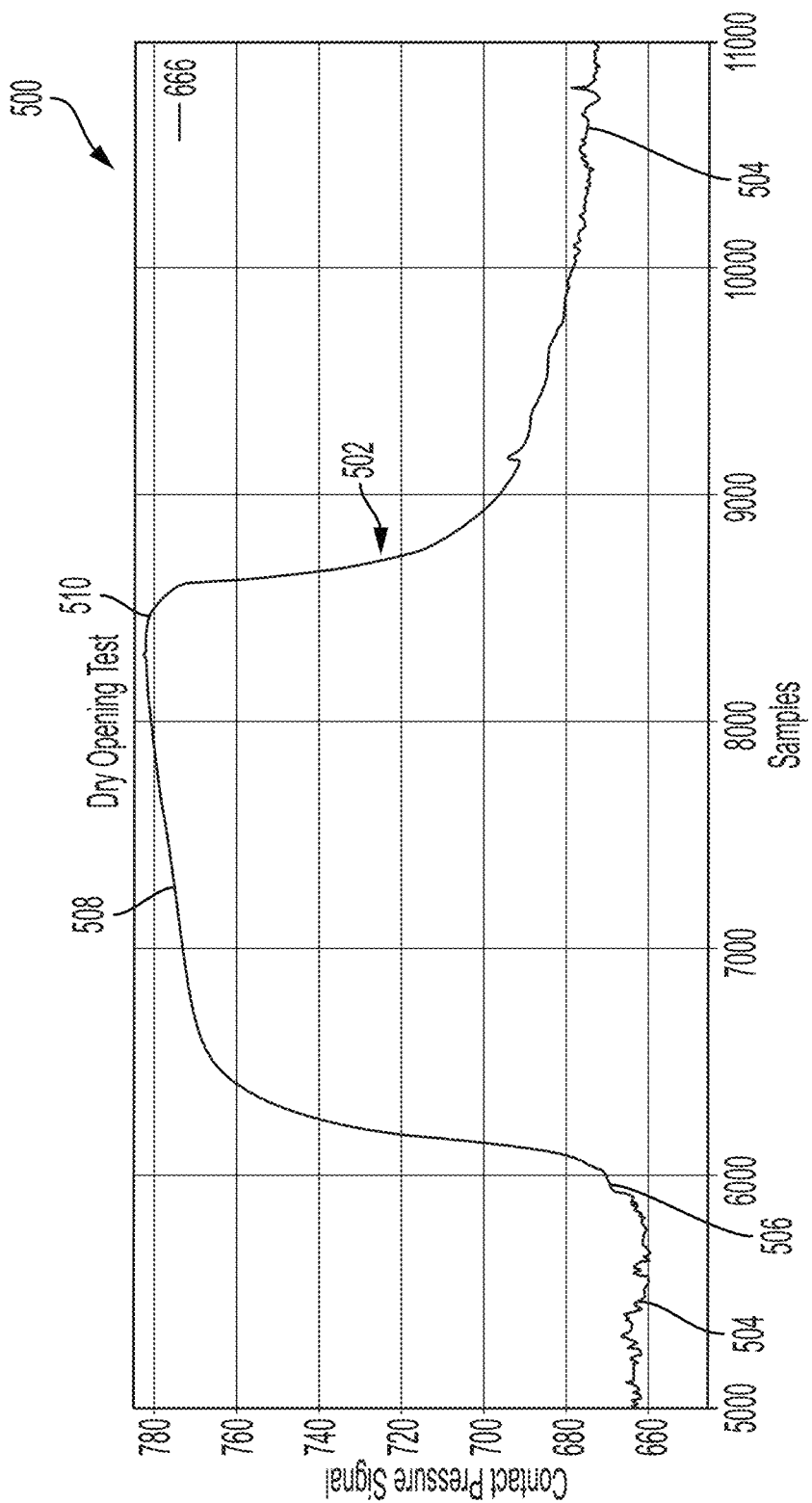
FIG. 5 is a graph illustrating dry opening testing of a contact sensor in a BFP system in accordance with the subject technology.

FIG. 5 illustrates a graph 500 illustrating a dry opening testing of a contact sensor such as shown in FIG. 3 in a BFP system in accordance with the subject technology. The graph 500 has the sensor signal on the vertical axis and samples over time on the horizontal axis. The sensor signal may be a measure of resistance. When opening from the closed position, the pressure on the contact sensor is released so that the resistance changes as indicated by the waveform 502 jumping upward from the baseline level 504 at point 506 to an elevated level 508. Upon closing to reapply pressure to the contact sensor, the resistance again changes so that the waveform 502 drops back down at point 510 to return to the closed baseline level 504. A controller receiving this signal can easily determine the position of the valve disc with respect to the valve seat.

Figure 6:
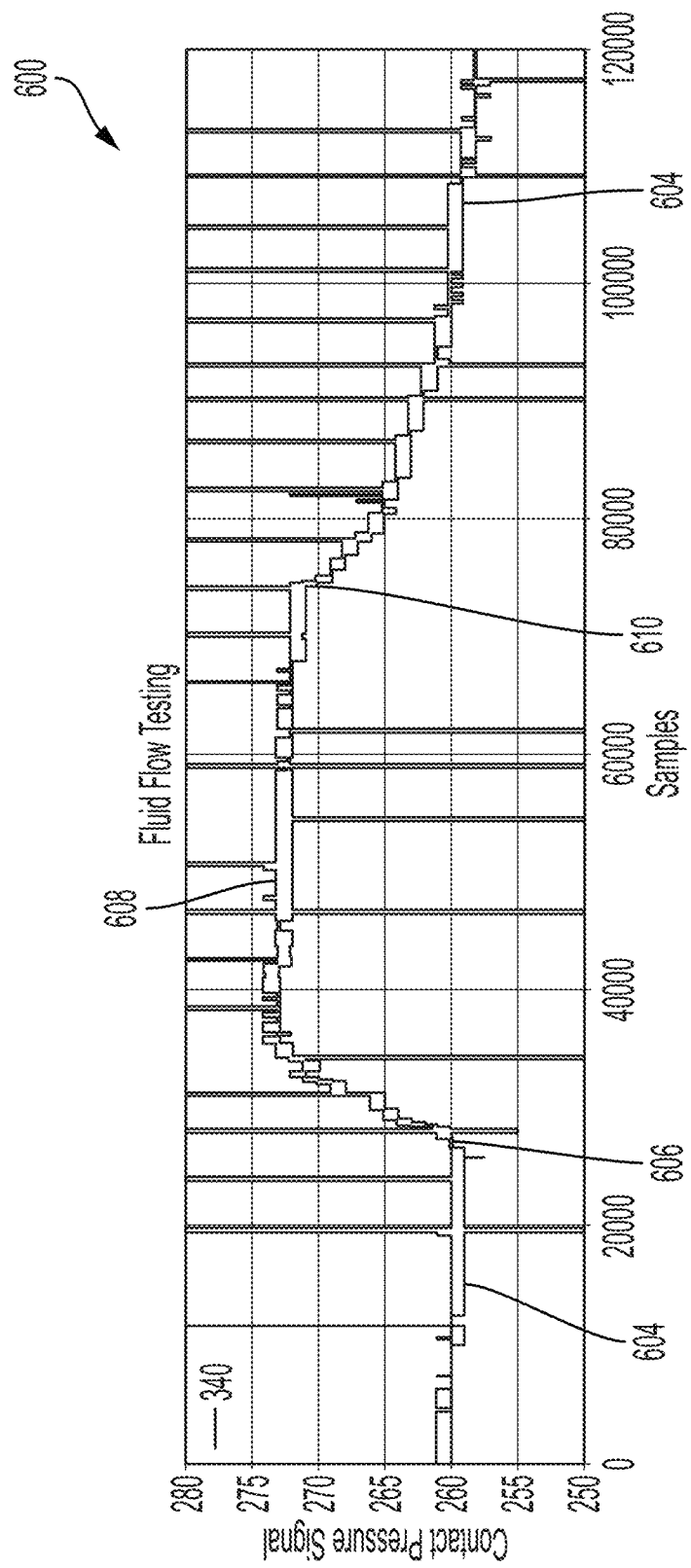
FIG. 6 is a graph illustrating fluid flow testing of a contact sensor in a BFP system in accordance with the subject technology.

FIG. 6 is another graph 600 illustrating fluid flow testing of a contact sensor such as shown in FIG. 3 in a BFP system in accordance with the subject technology. As can be seen, graph 600 includes the same rise in signal from baseline 604 at point 606 that corresponds to opening the check valve. Also, from the elevated level 608, the signal again drops at the point 610 of closing the check valve so that a controller can effectively monitor the position of the check valve as open or closed. As noted above, by recording the static pressure differences at the opening and closing of the check valves, the cracking and closing pressure of the check valves can be automatically monitored.

Figure 7:
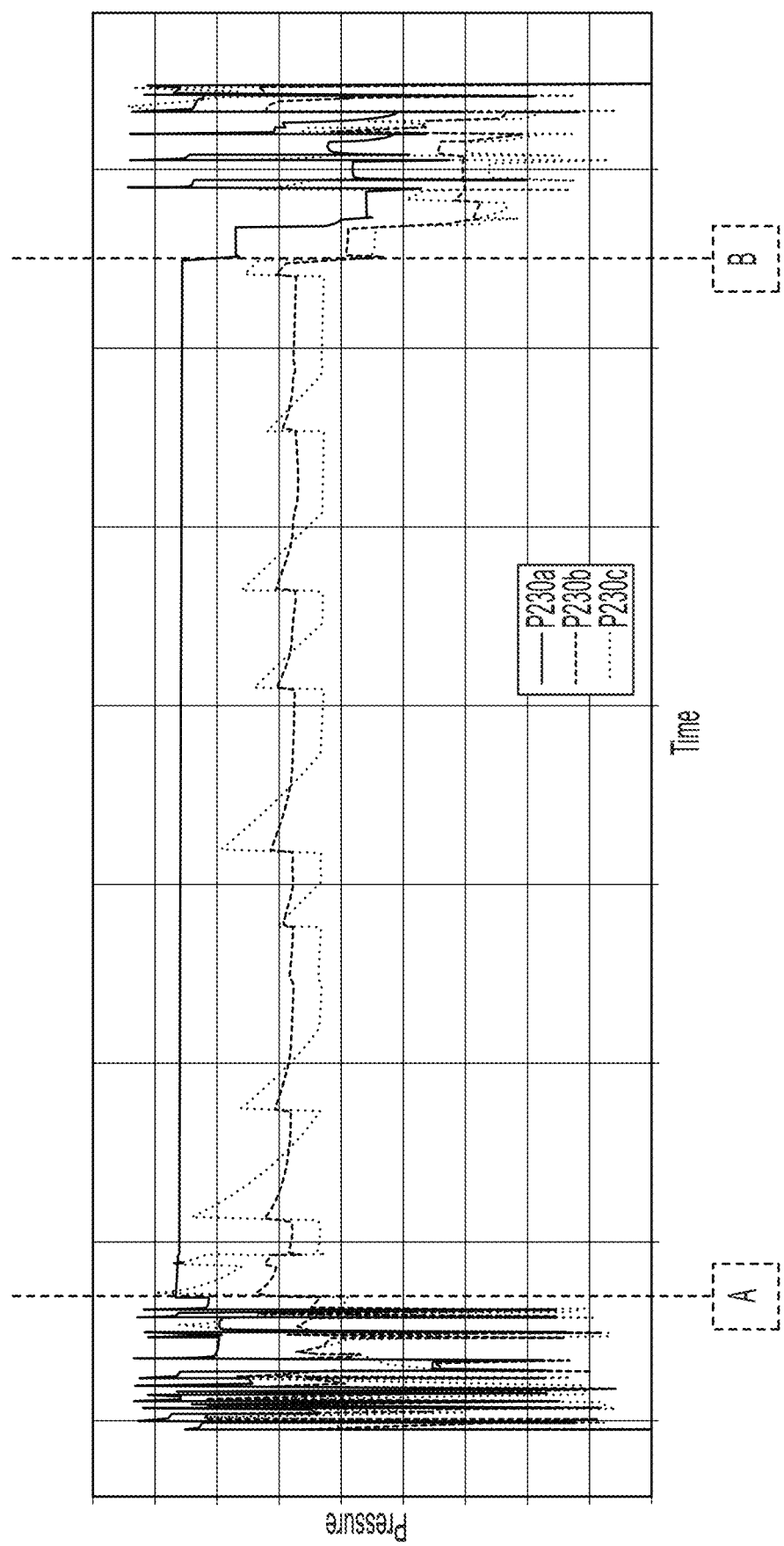
FIG. 7 is a graph of zone pressures versus time for a BFP system in accordance with the subject technology.

FIG. 7 is a graph showing an example of pressure measurements P230a, P230b, P230c over time, wherein P230a is measurement from the first pressure sensor 230a in the inlet pressure zone 222, P230b is measurement from the second pressure sensor 230b in the intermediate pressure zone 226, and P230c is measurement from the pressure sensor 230c in the outlet pressure zone 224. The area of graph between vertical lines A and B represent evening hours in a commercial building when the plumbing system is not in use and the first and the second check valve assemblies 210a, 210b are in closed positions according to the position sensors 232a, 232b.

As shown, the inlet pressure P230a, which is indicative of an upstream portion of the plumbing system, is constant, while the outlet pressure P230c, which is indicative of a downstream portion of the plumbing system, is not constant. It is presumed that the variations in the outlet pressure are due to temperature variations in the downstream portion of the plumbing system causing pressure fluctuations in the outlet. Nevertheless, what is interesting is that the pressure fluctuations in the outlet pressure zone 224 cause corresponding pressure fluctuations in the intermediate pressure zone 226, which is known as pistoning. Pistoning can cause damage and/or erroneous readings of the cracking pressure for backflow health monitoring.

It is thought that the pressure fluctuations in the intermediate pressure zone 226 are also dependent on the compression, or lack thereof, (i.e., stiffness) of the seals of the check valve assemblies 210a, 210b in closed positions. The pressure fluctuations, therefore, can be used to track and predict the conditions of the seals of the check valve assemblies 210a, 210b by noting any changes, deviations, or performance outside empirical norms.

The pressure measurements P230a, P230b, P230c may be used independently of, or in cooperation with, the contact sensors 232a, 232b to monitor the condition of the check valve assemblies 210a, 210b and the downstream portion of the plumbing system.

Still referring to FIG. 7, the downstream pressure rises from pistoning may be quite significant. As can be seen in FIG. 7, the signal P230b (e.g., the intermediate zone 226) correlates with signal P230c. A similar correlation may also be present in the intermediate zone 226 from pressure changes in the inlet zone 222. In short, pistoning demonstrates a mechanical communication between the fluid zones without leakage. Otherwise, the pressures would approach equilibrium as fluid flowed from between the zones 222, 224, 226, which means that the backflow preventer assembly 200 is functioning properly to oppose the backpressure.

However, pistoning is an undesirable event. For example, the downstream pressures can be quite high due to thermal expansion, fluid expanding from freezing such as in an icemaker, and the like. As a result, physical damage, leakage, and an inability to make cracking pressure readings for backflow health monitoring may occur. The subject technology can mitigate pistoning. Data science and neural networks can be used to find the correlated signals and the associated pistoning. In one embodiment, an expansion tank 250 can be installed to eliminate the pistoning by providing steady and stable pressure difference readings for backflow heath monitoring. The expansion tank 250 can include a motorized valve to selectively connect the expansion tank 250 when the controller 240 sees the pressure (e.g., at the outlet zone 224) is too great. Thus, pistoning could be used to verify the water-tightness of the check valves 210a, 210b while preventing unnecessarily high system pressures that could damage valves and fittings.

In one embodiment coupled to a water heater, thermal expansion of the water during heating can create excessive water pressure. The high water pressure can close the check valve 210b by pushing into the seats and thus, preventing flow from the outlet into the intermediate zone 226. However, the expansion tank 250 absorbs some of the pressure, whatever the cause, to prevent the pressure from becoming excessive and causing damage and/or malfunction. Also, pistoning can be used to verify the water-tightness of the check valves 210a, 210b by monitoring the differential pressures. If the differential pressures remain in the range of setup, then the water-tightness is confirmed.

Figure 8:
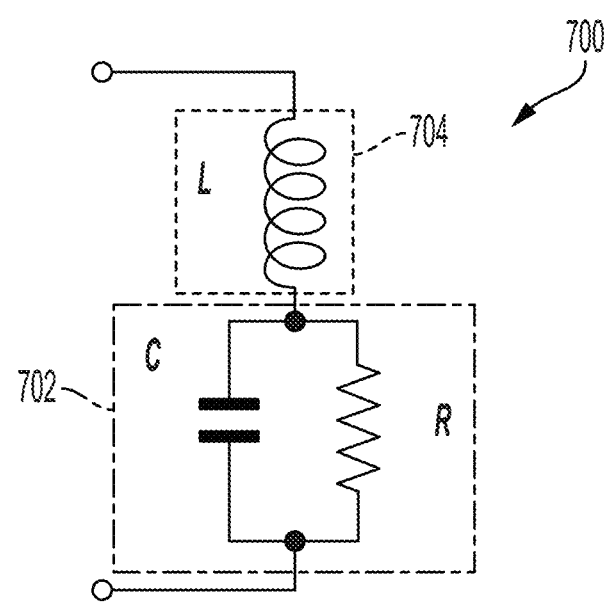
FIG. 8 is a schematic representation of another sensor using wireless technology for determining position of a check valve in accordance with the subject technology.

Referring now to FIG. 8, a schematic representation of another sensor 700 using wireless technology for determining position of a check valve in accordance with the subject technology is shown. The sensor 700 can again utilize a piezoresistive polymer composite portion 702, which also exhibits piezocapacitive properties. By integrating an inductor/antenna portion 704 into a valve disc composed of the piezoresistive polymer composite and coupling the inductor/antenna portion 704 to the piezoresistive polymer composite portion 702, the sensor signals can be monitored wirelessly without the need to route wires through the check valve. In one embodiment, the piezoresistive polymer composite is santoprene, which is an injection moldable thermoplastic elastomer (TPE) and, more particularly a thermoplastic vulcanizate (TPV). Other electroactive polymers may be used in place of the piezoresistive polymer.

Figure 9:
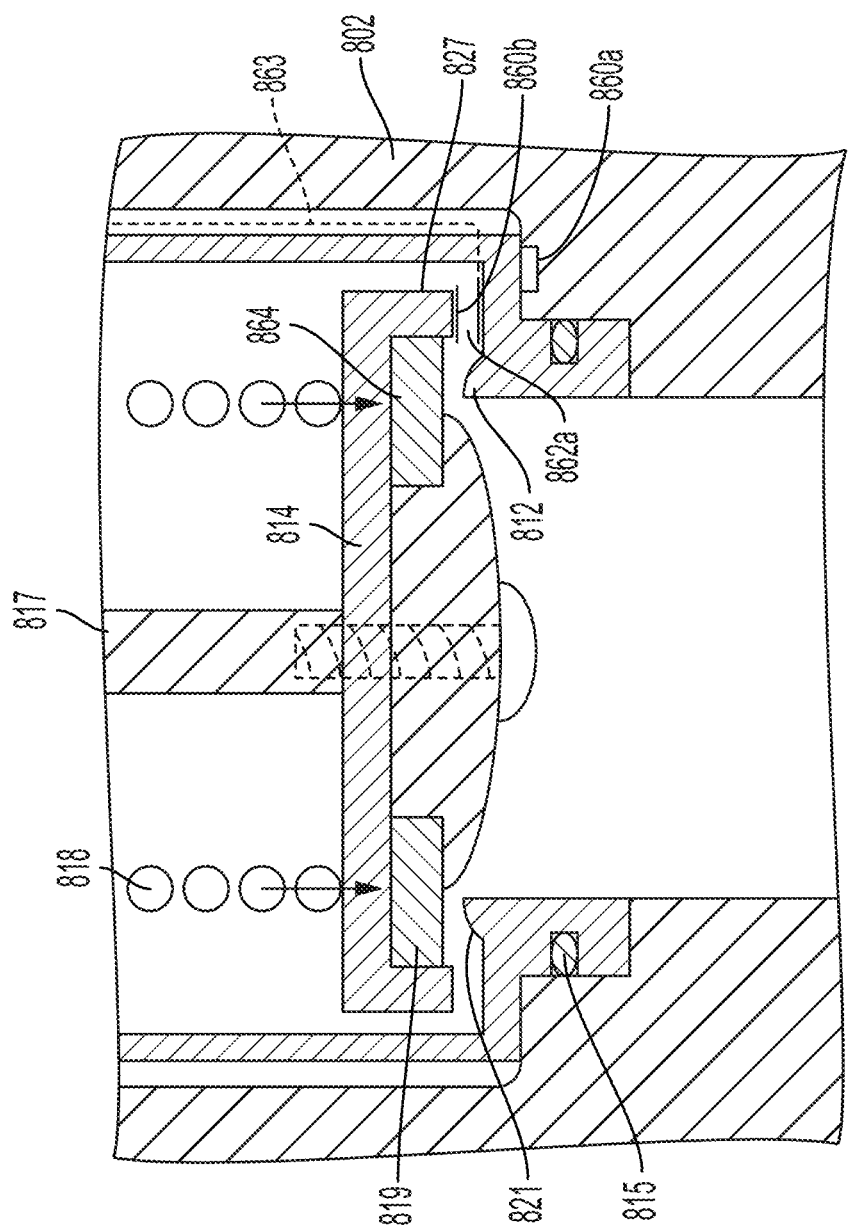
FIG. 9 is a cross-sectional view of another check valve for determining position of a check valve in accordance with the subject technology.

Referring now to FIG. 9, a cross-sectional view of another check valve 800 for determining position of a check valve in accordance with the subject technology is shown. The cross-sectional view is helpful to illustrate how various technology may be deployed in various locations to generate a signal indicative of the position of the check valve 800. The check valve 800 is not unlike the ones described above in that the check valve includes a valve disc 814 slidingly mounted in a housing 802 to seal against a valve seat 812 sealed in place with an o-ring 815. A valve stem 817 and bias spring 818 help to guide movement of the valve disc 814 and keep the check valve 800 in a normally closed position. The valve disc 814 includes a contact ring 819 that seals against an annular mating portion 821 of the valve seat 812. As noted above, any of these components may be integrally formed with a portion of a position sensor.

One embodiment of a sensor utilizes proximity or non-contact detection such as Hall effect, capacitive, Eddy current and Linear Variable Differential Transformer (LVDT) technology. Still referring to FIG. 9, one possible placement for a position sensor 860a is under the valve seat 812. As a depending shoulder 827 of the valve disc 814 moves into the closed position, the depending shoulder 827 creates pressure that can activate the sensor 860a. Alternatively or in addition, the depending shoulder 827 may carry a component 860b of the sensor such as a magnet thereon to activate a Hall effect component 860a. Also, with contact, the sensor 860a, component 860b, valve seat 812 and other necessary components may simply complete a circuit to indicate valid closing.

In another embodiment, the depending shoulder 827 carries a component 860b of the sensor that directly interacts with a complimentary component 862a on the valve seat 812. The complimentary component 862a is connected to a controller by wire 863. In this version, the components are arranged so that upon closing the of the check valve 800, the components 860b 862a interact such as by contact so that a signal is generated to indicate the closed position. Again, as noted above, a sensor component 864 may be assembled into the valve disk 814 behind the contact ring 819. Preferably, the sensor component 864 generates a closed signal in response to the closing pressure applied to the contact ring 819.

Still referring to FIG. 9, the o-ring 815 can also be configured to sense the position of the check valve 800 by having an integral pressure sensing element. Alternatively, various soft components can have switches embedded therein. For example, the annular sealing portion 821 can be flexible rubber with a switch embedded therein so that upon closing of the check valve 800, the switch is activated.

Figure 1B:
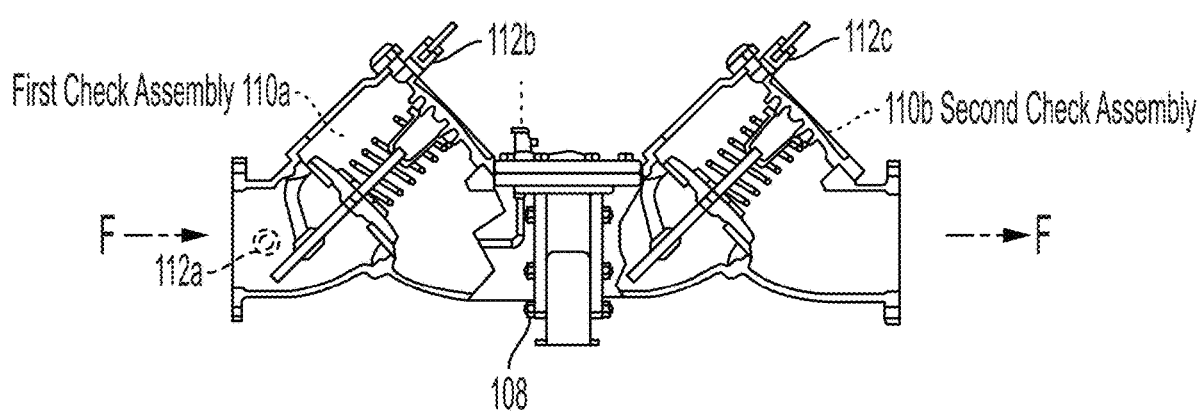

It is envisioned that the subject technology can be retrofit on to a wide variety of backflow prevention and related devices such as the prior art device 100 of FIG. 1. The test-cocks that come standard on most backflow preventers can be used to access the chamber pressure and route sensor wires into the BFP assembly. For example, the pressure sensors can be added by reconfiguring the housing while adding position sensors by reconfiguring or reworking the check valves. Additional examples are found in U.S. Provisional Patent Application No. 62/844,912 filed on May 8, 2019 entitled "Backflow Prevention System Test Cock with a Fluid Sensor" and U.S. Provisional Patent Application No. 62/869,195 filed on Jul. 1, 2019 entitled "Wireless Communication System within a Mechanical Room," each of which is incorporated herein by reference. The subject technology applies to any double check valve and reduced pressure backflow preventer.

The subject technology, therefore, provides contact sensors 232a, 232b for monitoring whether the check valves in a backflow prevention valve assembly are open or closed, so that the cracking pressure and any leakage can be tracked with the pressure sensors 230a-c. Cracking pressure is a regulated value for BFP check valve performance. Measuring the pressure difference at the instant that the valves open or close will provide direct continuous monitoring of that value over time.

Furthermore, if both check valves are closed, changes in the intermediate pressure zone indicates that at least one check valve is leaking. Monitoring the intermediate pressure zone over time may indicate the condition of the valve seals/gaskets and allow the prediction future failures. The pressure sensors 230a-c can also be used to track the condition of the connected plumbing system. For example, pressure fluctuations in the outlet pressure zone 224 may be used to detect water leaks in the downstream plumbing system.

Figure 10:
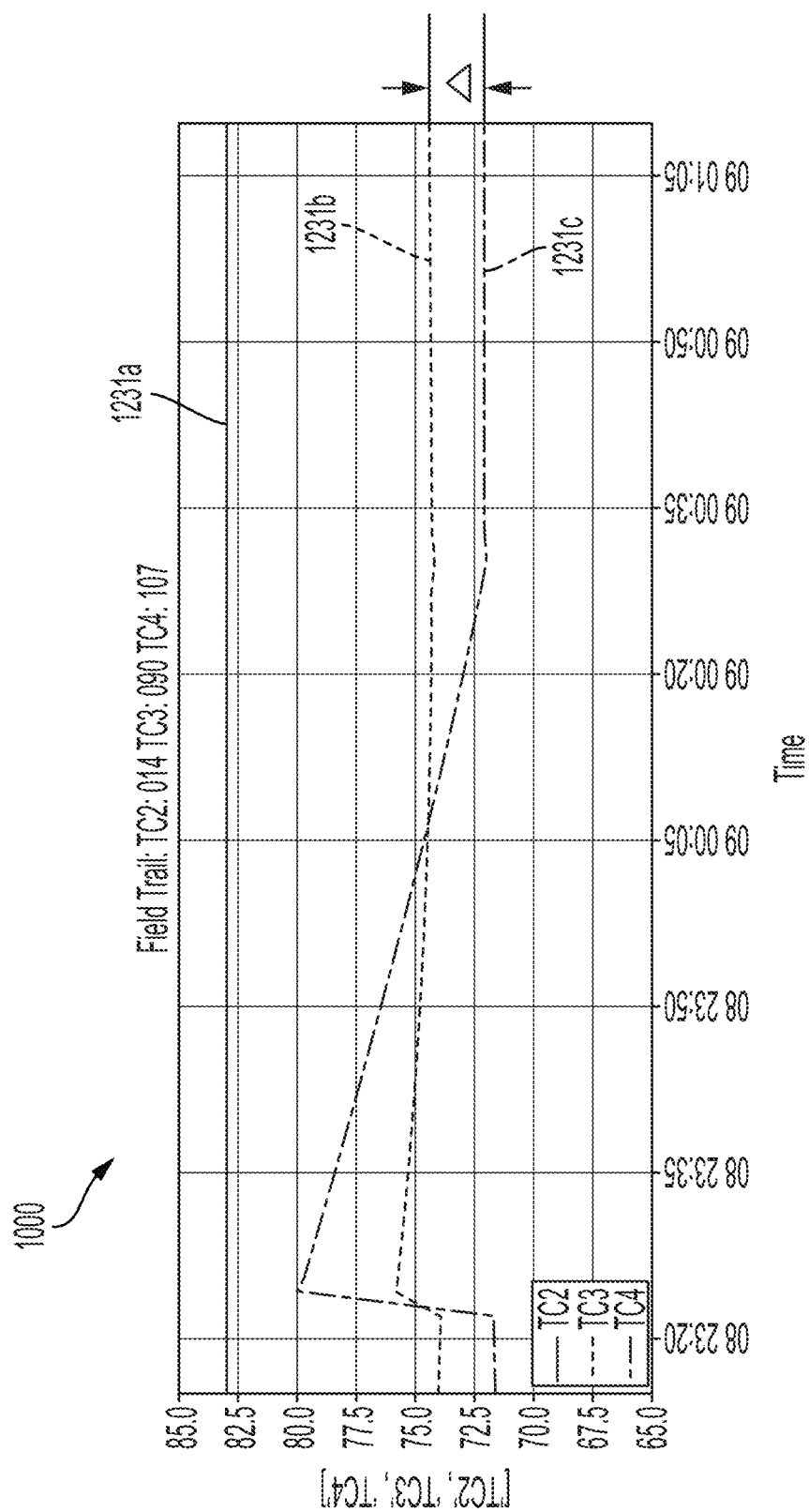
FIG. 10 is a graph illustrating monitoring pressure in a backflow prevention (BFP) device in accordance with the subject technology.

Referring now to FIG. 10, a graph 1000 illustrating monitoring pressure in a backflow prevention (BFP) device is shown. By monitoring downstream pressure, such as caused by thermal and pressure fluctuations, it is possible to test for the closing pressure, opening pressure and watertightness of the BFP system. Although not limited to such, an example of a BFP system 200 was described above with respect to FIG. 2. For monitoring downstream pressure, the BFP system 200 only requires three pressure sensors 230a-c. As can be seen in FIG. 10, a large change in pressure in the outlet zone 224 corresponds to a pressure change in the intermediate zone 226 even during proper operation of the backflow assembly 200 as described in more detail herein.

In one embodiment, the pressure sensors 230a-c, shown in FIG. 2, are retrofit into the TC 212a-c, respectively. As such, pressure sensor 230a measures the inlet zone 222, pressure sensor 230b measures the intermediate zone 226, and pressure sensor 230c measures the outlet zone 224.

The graph 1000 illustrates the pressure rise and drop cycle driven by, for example, a normal thermal cycle in the building. As the BFP system 200 is functioning properly, the signal 123 la from pressure sensor 230a is steady during the cycle. Typically, the inlet zone pressure is fixed by a regulator or system supply. However, the signal 1231c from pressure sensor 230c experiences the largest changes from fluctuations in the downstream pressure. At the same time, the signal 1231b from pressure sensor 230b, inside the BFP system 200, has a relatively smaller, muted pressure change that is correlated with the signal 1231c. In this embodiment, the correlation is cause by the disc 814 of the downstream check valve 210b being compressed in the seat 812 and pressurizing the intermediate zone 226 in a pistoning effect. At the end of the cycle, the signals 1231b, 1231c return to a fixed difference A set by the opening pressure of the check valve 210b.

If a leak were present in the BFP system 200, in check valve 210b, the pressure would bleed into the intermediate zone 226. As the pressure equalizes across check valve 210b, the signal 1231b and signal 1231c would converge. The controller 240 can compare the signals 231b, 231c to make the leak determination. For example, once a difference of the pressures comes within a predetermined value, the error signal is generated for investigation and correction. Additionally, excess pressure in the intermediate zone 226 from the pistoning effect can cause fluid to bleed across the first check valve 210a until the pressure difference was low enough to open the first check valve 210b. The controller 240 can also recognize this pistoning effect and deploy an expansion tank 250 as noted herein.

Figure 11:
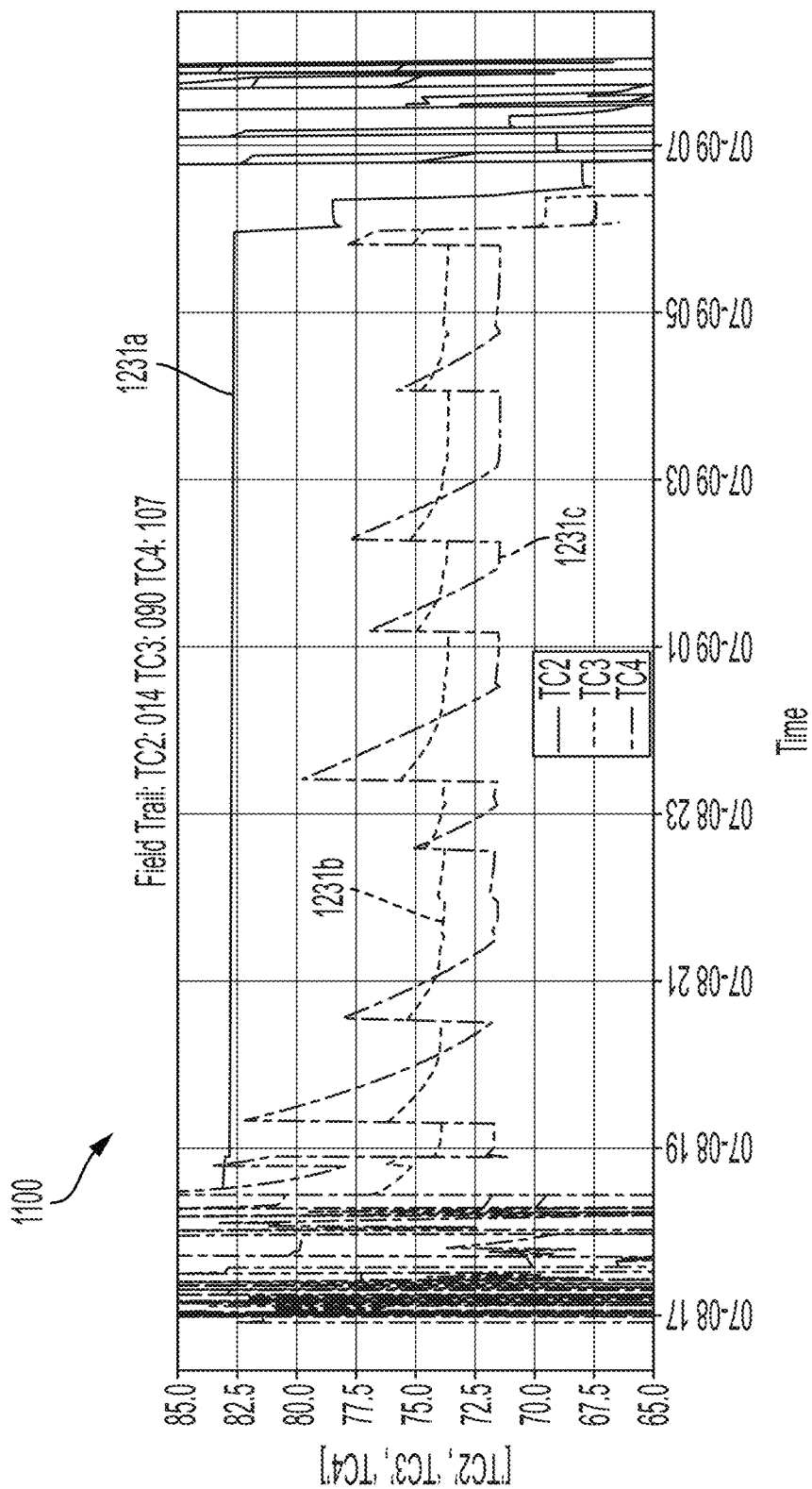
FIG. 11 is another graph illustrating monitoring pressure in a backflow prevention (BFP) device in accordance with the subject technology.

Referring now to FIG. 11, another graph 1100 illustrating monitoring pressure with the same sensor arrangement of FIG. 10 is shown. However in FIG. 11, as the pipes (not shown) cool down during a thermal cycle, the fluid in the pipes contracts. As a result, the system pressure lowers until the check valves open to maintain a pre-set differential across the check valve 210b. Typically, the opening size and spring force of the check valves 210a, 201b determines the pre-set differential.

By detecting the periods of equalization and recording the pressure differential, an opening/closing test can be performed. In one approach, the opening/closing test bins the pressure sensor data when the building is unoccupied in a two dimensional histogram and reports the differential pressure DP1 versus differential pressure DP2 with the most recorded data points as shown and as may be created from the software of FIG. 12.

Another approach is to identify regions of inactivity, and record the maximum pressure differential across each check valve 210a, 210b during the inactive regions. Provided the pressure differentials remain in the range of set up, watertightness is confirmed. FIG. 13 is an exemplary software code routine to determine the pressure differential across each check valve 210a, 210b.

The flowcharts herein illustrate the structure or the logic of the present technology, possibly as embodied in computer program software for execution on a controller, a computer, digital processor or microprocessor. Those skilled in the art will appreciate that the flow charts illustrate the structures of the computer program code elements, including logic circuits on an integrated circuit, that function according to the present technology. As such, the present technology may be practiced by a machine component that renders the program code elements in a form that instructs a digital processing apparatus (e.g., microprocessor, computer, controller and the like) to perform a sequence of function steps corresponding to those shown in the flow charts. The controller may be a general purpose smart device with applications software or a purpose specific design.

Figure 14:
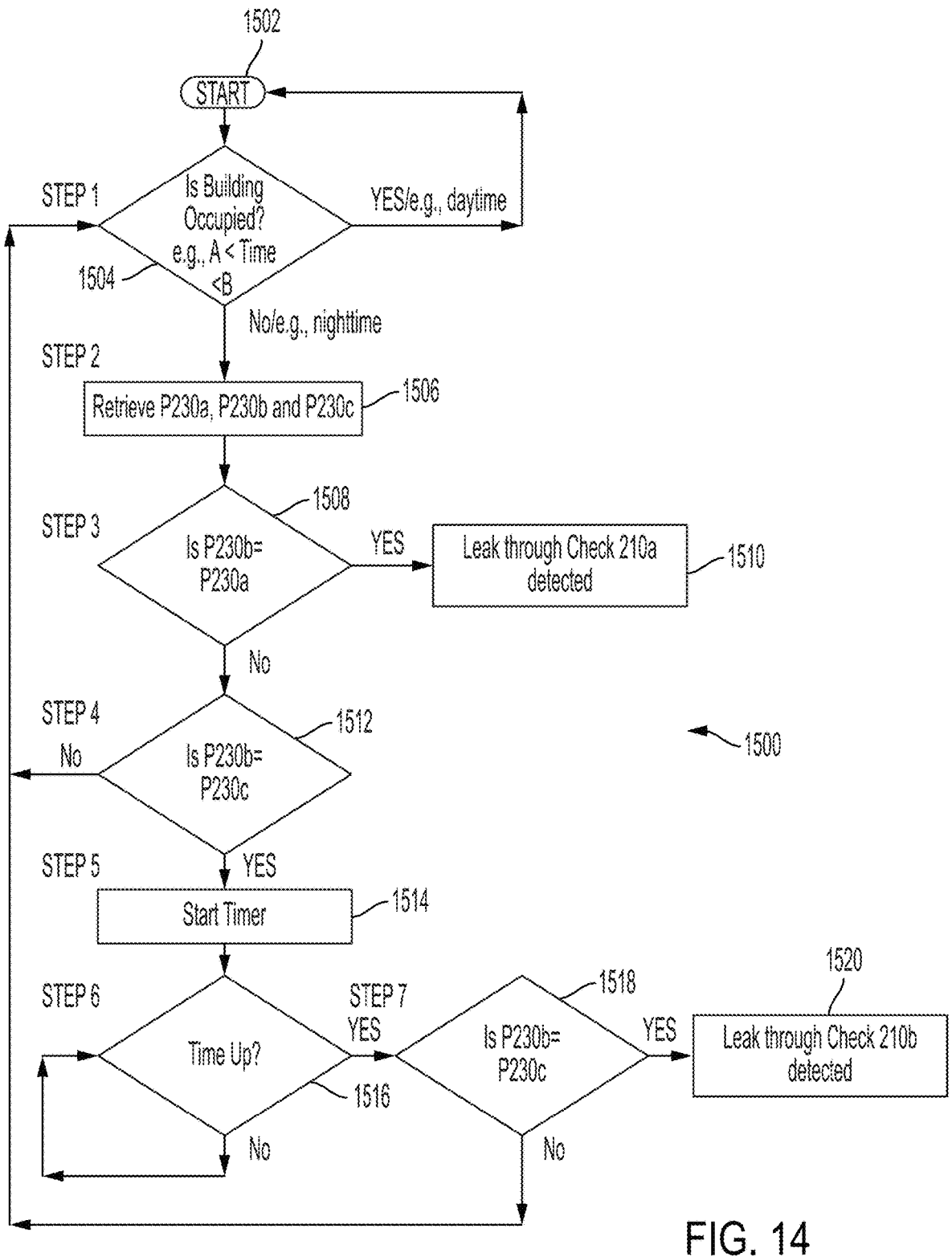
FIG. 14 is an exemplary flowchart depicting a process for monitoring a backflow prevention (BFP) system in a building in accordance with the subject technology.

Referring now to FIG. 14, there is illustrated a flowchart 1500 depicting a process for monitoring a backflow prevention (BFP) system 1000 in a building. Preferably, the BFP system 1000 has the pressure sensors 230a-c for measuring the inlet zone 222, the intermediate zone 226, and the outlet zone 224, respectively. At step 1502, the process begins by activating the controller 240, which communicates with the pressure sensors 230a-c.

At step 1504, the controller 240 determines whether or not the building is occupied. As there are typical pressure fluctuations during the day when in use, the process is preferably only run during more steady-state unoccupied times. The controller 240 may simply have an internal clock with user input settings to determine the unoccupied weekend and nightly hours. For example, the time may be between 8 am and 7 pm, so that the building is deemed occupied and the process reverts to step 1502 for periodic checking at step 1504. In another embodiment, the controller 240 monitors the fluctuations and determines steady-state conditions as compared to stored parameters for determining if the process should be executed. If the building is deemed unoccupied (e.g., between 7 pm and 8 am or otherwise sufficiently steady-state), the process proceeds to step 1506.

At step 1506, the controller 240 retrieves the readings from the pressure sensors 230a-c and stores the readings in memory for analysis. At step 1508, the controller 240 compares the readings from pressure sensor 230a (e.g., the inlet zone 222) and pressure sensor 230b (e.g., the intermediate zone 226). If the inlet zone 222 and intermediate zone 226 are substantially equal, the process proceeds to step 1510. At step 1510, the controller 240 determines that a leak may be present through upstream check valve assembly 210a. The controller 240 may also issue warnings and notification so that corrective action and maintenance may be performed. If the inlet zone 222 and intermediate zone 226 are not substantially equal, the process proceeds to step 1512.

At step 1512, the controller 240 compares the readings from pressure sensor 230c (e.g., the outlet zone 224) and pressure sensor 230b (e.g., the intermediate zone 226) and saves the result. The process proceeds to step 1514 where a timer is started by the controller 240. While the timer is running, the process proceeds to step 1516. The controller 240 determines if the timer has run.

Once the time is up, the process proceeds to step 1518 to recheck if the readings from pressure sensor 230c and pressure sensor 230b are equal. If the readings from pressure sensor 230c (e.g., the outlet zone 224) and pressure sensor 230b (e.g., the intermediate zone 226) are not substantially equal, the process returns to step 1504 to be rerun. If the readings from pressure sensor 230c (e.g., the outlet zone 224) and pressure sensor 230b (e.g., the intermediate zone 226) are substantially equal at step 1518, the process proceeds to step 1520. At step 1520, the controller 240 determines that a leak may be present through check valve assembly 210b and generates an indicative warning signal. The controller 240 may also rerun steps 1512-1520 to verify additional times. At step 1520, the controller 240 may issue warnings and notification so that corrective action and maintenance may be performed.

As can be seen, the process of flowchart 1500 can not only uncover a leak, the process specifically identifies the particular check valve assembly that is the likely cause of the leak without requiring maintenance personnel to perform an inspection.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., check valves, shut-off valves, and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A backflow preventer for preventing a reverse flow of water in a plumbing system, comprising: a body having: an inlet for connection to an upstream portion of the plumbing system; an outlet for connection to a downstream portion of the plumbing system; and an intermediate pressure zone between the inlet and outlet; an inlet check valve located in the body for preventing the reverse flow of water from the intermediate pressure zone through the inlet; an outlet check valve located in the body for preventing the reverse flow of water from the outlet into the intermediate pressure zone; an inlet pressure sensor located in an inlet pressure zone positioned in the body between the inlet and the inlet check valve; an intermediate pressure sensor located in the intermediate pressure zone; an outlet pressure sensor located in an outlet pressure zone positioned in the body between the outlet and the outlet check valve; and a controller in communication with the inlet, intermediate, and outlet pressure sensors wherein the controller is operative to:

monitor a pressure differential between the outlet pressure zone and the intermediate pressure zone; compare the pressure differential to a pre-set range; generate a first message when the pressure differential is outside the pre-set range; monitor an inlet pressure in the inlet pressure zone; generate a second message if the inlet pressure varies outside a pre-set range; and generate a leak error signal if pressure in the intermediate pressure zone rises while both check valves are in a closed position.

2. The backflow preventer of claim 1, wherein the controller determines a cracking pressure for each check valve based upon communications received from the inlet, intermediate, and outlet pressure sensors.

3. The backflow preventer of claim 2, wherein the controller generates an error signal if either cracking pressure is outside a predetermined range.

4. The backflow preventer of claim 2, wherein the cracking pressure of the first inlet check valve is equal to a difference between the first inlet pressure sensor and the second intermediate pressure sensor when the first inlet check valve moves from a closed position to an open position.

5. The backflow preventer of claim 1, wherein the controller determines a closing pressure for each check valve based upon based upon communications received from the inlet, intermediate, and outlet pressure sensors.

6. The backflow preventer of claim 5, wherein the closing pressure of the second outlet check valve is equal to a difference between the third outlet pressure sensor and the second intermediate pressure sensor when the second outlet check valve moves from an open position to a closed position.

7. The backflow preventer of claim 1, wherein the controller is further operative to detect leaks in the downstream portion of the plumbing system based upon communications received from at least one of the inlet, intermediate, or outlet pressure sensors.

8. The backflow preventer of claim 1, further comprising an expansion tank connected downstream from the outlet check valve for selectively stabilizing an outlet pressure in the outlet pressure zone, wherein the controller is further operative to determine a pressure reading using the intermediate pressure sensor and fluidly connect the expansion tank to the outlet pressure zone based on the pressure reading of the intermediate pistoning effect.

9. A backflow preventer for preventing a reverse flow of water in a plumbing system, comprising: a body having: an inlet for connection to an upstream portion of the plumbing system; an outlet for connection to a downstream portion of the plumbing system; and an intermediate pressure zone between the inlet and outlet; an inlet check valve located in the body for preventing the reverse flow of water from the intermediate pressure zone through the inlet; an outlet check valve located in the body for preventing the reverse flow of water from the outlet into the intermediate pressure zone; an inlet pressure sensor located in an inlet pressure zone positioned in the body between the inlet and the first inlet check valve; an intermediate pressure sensor located in the intermediate pressure zone; an outlet pressure sensor located in an outlet pressure zone positioned in the body between the outlet and the second outlet check valve; and a controller in communication with the inlet, intermediate, and outlet pressure sensors wherein the controller is operative to: monitor a pressure differential between the outlet pressure zone and the intermediate pressure zone; compare the pressure differential to a pre-set range; generate a first message when the pressure differential is outside the pre-set range; monitor an inlet pressure in the inlet pressure zone; and generate a second message if the inlet pressure varies outside a pre-set range; and wherein the controller is further operative to monitor stiffness of seals of the check valves based upon communications received from the intermediate pressure sensor when the check valves are both in a closed position.

10. A backflow preventer for preventing a reverse flow of water in a plumbing system, comprising: a body having: an inlet for connection to an upstream portion of the plumbing system; an outlet for connection to a downstream portion of the plumbing system; and an intermediate pressure zone between the inlet and outlet; an inlet check valve located in the body for preventing the reverse flow of water from the intermediate pressure zone through the inlet; an outlet check valve located in the body for preventing the reverse flow of water from the outlet into the intermediate pressure zone; an inlet pressure sensor located in an inlet pressure zone positioned in the body between the inlet and the inlet check valve; an intermediate pressure sensor located in the intermediate pressure zone; an outlet pressure sensor located in an outlet pressure zone positioned in the body between the outlet and the outlet check valve; and a controller in communication with the inlet, intermediate, and outlet pressure sensors wherein the controller is operative to: monitor a pressure differential between the outlet pressure zone and the intermediate pressure zone; compare the pressure differential to a pre-set range; generate a first message when the pressure differential is outside the pre-set range; monitor an inlet pressure in the inlet pressure zone; generate a second message if the inlet pressure varies outside a pre-set range; and wherein the second message is generated when the inlet pressure zone and the intermediate pressure zone are approximately equal.

11. A system for monitoring a backflow preventer valve assembly in a fluid network in a building, comprising:
an inlet pressure sensor for determining pressure at an inlet of the backflow preventer valve assembly;
an intermediate pressure sensor for determining pressure between an inlet and an outlet check valve;
an outlet pressure sensor for determining pressure at an outlet of the backflow preventer valve assembly; and
a controller in communication with the inlet, intermediate, and outlet pressure sensors, wherein the controller is operative to:
determine when the building is unoccupied;
retrieve and store readings from the inlet, intermediate, and outlet pressure sensors when the building is unoccupied;
compare readings from the inlet pressure sensor and intermediate pressure sensor;
if the reading from the inlet pressure sensor and the intermediate pressure sensor are substantially equal, generate a warning indicating that a leak may be present;
compare the readings from the outlet pressure sensor and the intermediate pressure sensor at a first point in time;
start a timer;
when the timer has run out at a second point in time, recheck if the readings from the outlet pressure sensor and the intermediate pressure sensor are equal; and
if the readings from the outlet pressure sensor and the intermediate pressure sensor are substantially equal at the first and second points of time, generate a warning that a leak may be present through the outlet check valve.

12. A system as recited in claim 11, wherein the controller is further operative to determine when the building is unoccupied based on the readings from the outlet pressure sensor.

13. A system as recited in claim 11, wherein the controller is further operative to determine when the building is unoccupied based on time of day and the warning indicating that the leak may be present indicates that the leak is through the inlet check valve.

14. A system for monitoring a backflow preventer valve assembly in a fluid network in a building, comprising:
an intermediate pressure sensor for determining pressure between an inlet and an outlet check valve;
an outlet pressure sensor for determining pressure at an outlet of the backflow preventer valve assembly; and
a controller in communication with the inlet, intermediate, and outlet pressure sensors, wherein the controller is operative to:
compare the readings from the outlet pressure sensor and the intermediate pressure sensor at a first point in time;
start a timer;
when the timer has run out at a second point in time, recheck if the readings from the outlet pressure sensor and the intermediate pressure sensor are equal; and if the readings from the outlet pressure sensor and the intermediate pressure sensor are substantially equal at the first and second points of time, generate a warning that a leak may be present through the outlet check valve.

15. A system as recited in claim 14, wherein at least one of the inlet, intermediate, or outlet pressure sensors configured to be is powered by hydroelectric power generated by water flowing through the backflow preventer valve assembly.

16. A system as recited in claim 14, wherein at least one of the intermediate, or outlet pressure sensors is part of a test cock and further comprising a relief valve assembly located between the check valves.

17. A system as recited in claim 14, further comprising an expansion tank connected downstream from the outlet check valve for selectively stabilizing an outlet pressure, wherein the controller is further operative to determine a pressure reading using the intermediate pressure sensor and fluidly connect the expansion tank to the outlet check valve based on the pressure reading of the intermediate pressure sensor.

* * * * *